US010996827B2

(12) United States Patent
Vaidyanath et al.

(10) Patent No.: US 10,996,827 B2
(45) Date of Patent: May 4, 2021

(54) SYSTEM FOR RENDERING APPLICATIONS BASED ON REAL TIME ACCESSIBILITY ASSESSMENT

(71) Applicant: BANK OF AMERICA CORPORATION, Charlotte, NC (US)

(72) Inventors: Madhav Vaidyanath, TamilNadu (IN); Vinod Anbalagan, TamilNadu (IN); Thilagaraj Kannaiyan, TamilNadu (IN); Varshini Ramiya Vasudevan, TamilNadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/507,849

(22) Filed: Jul. 10, 2019

(65) Prior Publication Data
US 2021/0011593 A1 Jan. 14, 2021

(51) Int. Cl.
| G06F 3/048 | (2013.01) |
| G06F 3/0484 | (2013.01) |
| G06F 9/451 | (2018.01) |
| G06F 3/16 | (2006.01) |
| G06N 20/00 | (2019.01) |
| G06F 16/28 | (2019.01) |
| G10L 13/00 | (2006.01) |

(52) U.S. Cl.
CPC ............ *G06F 3/0484* (2013.01); *G06F 3/167* (2013.01); *G06F 9/451* (2018.02); *G06F 16/285* (2019.01); *G06N 20/00* (2019.01); *G10L 13/00* (2013.01)

(58) Field of Classification Search
CPC ...... G06F 3/0484; G06F 9/451; G06F 16/285; G06F 3/167; G06N 20/00; G10L 13/00
USPC ........................................................ 715/727
See application file for complete search history.

(56) References Cited

U.S. PATENT DOCUMENTS

| 6,714,963 | B1 | 3/2004 | Levine et al. |
| 6,941,509 | B2 | 9/2005 | Harris |
| 7,657,828 | B2 | 2/2010 | Lucas et al. |
| 8,260,903 | B2 | 9/2012 | Ganesh et al. |
| 8,723,941 | B1 | 5/2014 | Shirbabadi et al. |
| 8,996,384 | B2 | 3/2015 | Funyak et al. |
| 9,152,734 | B2 * | 10/2015 | Rinearson .............. G06Q 30/02 |
| 9,680,846 | B2 * | 6/2017 | Haugsnes ......... G06F 16/24575 |
| 9,875,671 | B2 | 1/2018 | Gharpure et al. |
| 9,904,455 | B2 * | 2/2018 | Ban ...................... G06F 3/0481 |

(Continued)

*Primary Examiner* — David Phantana-angkool
(74) *Attorney, Agent, or Firm* — Michael A. Springs; Moore & Van Allen PLLC; Nicholas C. Russell

(57) ABSTRACT

Embodiments of the present invention provide a system for rendering applications based on real-time accessibility assessment. The system is configured for identifying that a user is accessing an application on a user device, capturing real-time accessibility data associated with the user device of the user and real-time usage data associated with the user, wherein the real-time usage data is associated with usage of the application, validating the real-time accessibility data and the real-time usage data; inputting the real-time accessibility data and the real-time usage data into a machine learning model, analyzing the real-time accessibility data and the real-time usage data, via the machine learning model, generating an accessibility score based on analyzing the real-time accessibility data and the real-time usage data, and rendering the application based on the accessibility score.

19 Claims, 5 Drawing Sheets

(56) References Cited

U.S. PATENT DOCUMENTS

| | | | |
|---|---|---|---|
| 9,916,128 B2 | 3/2018 | Badger et al. | |
| 10,235,130 B2* | 3/2019 | Bai | G06F 40/30 |
| 10,417,613 B1* | 9/2019 | Brisebois | G06Q 10/1095 |
| 10,432,605 B1* | 10/2019 | Lester | G06F 21/552 |
| 10,503,468 B2 | 12/2019 | Thangarathnam | G10L 15/22 |
| 10,878,387 B2* | 12/2020 | Weinflash | G06Q 20/405 |
| 2009/0157714 A1* | 6/2009 | Stanton | G06K 9/6215 |
| 2012/0109802 A1* | 5/2012 | Griffin | G06Q 40/00 |
| | | | 705/35 |
| 2015/0113006 A1* | 4/2015 | Almaer | G10L 15/26 |
| | | | 707/750 |
| 2015/0195406 A1* | 7/2015 | Dwyer | G06F 21/6254 |
| | | | 379/265.07 |
| 2017/0365101 A1* | 12/2017 | Samec | G02B 27/017 |
| 2019/0150823 A1* | 5/2019 | Hinton | G16H 40/20 |
| 2019/0333100 A1* | 10/2019 | Sohum | G06F 21/316 |
| 2020/0050624 A1* | 2/2020 | Rauchberger | H04L 51/10 |

* cited by examiner

SYSTEM FOR RENDERING APPLICATIONS BASED ON REAL TIME ACCESSIBILITY ASSESSMENT

BACKGROUND

Applications are accessed by users every day on multiple user devices and the applications are typically designed by not considering various accessibility challenges that are associated with the users and the user devices. Current conventional systems do not address the accessibility challenges which degrade the user experience while accessing the applications. As such, there exists a need for a system to render applications based on assessing the accessibility challenges in real-time, thereby enhancing the user experience while using the applications.

SUMMARY

Embodiments of the present invention address the above needs and/or achieve other advantages by providing apparatuses (e.g., a system, computer program product and/or other devices) and methods for rendering applications based on real-time accessibility assessment. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may identify that a user is accessing at least one application on a user device, in response to identifying that the user is accessing at least one application, capture real-time accessibility data associated with the user device of the user and real-time usage data associated with the user, wherein the real-time usage data is associated with usage of the at least one application, validate the real-time accessibility data and the real-time usage data, input the real-time accessibility data and the real-time usage data into a machine learning model, analyze the real-time accessibility data and the real-time usage data, via the machine learning model, and generate an accessibility score based on analyzing the real-time accessibility data and the real-time usage data via the machine learning model.

In some embodiments, the system may render the at least one application based on the accessibility score. In some embodiments, the system may render the at least one application by performing at least one of prioritizing content on a graphical user interface associated with the at least one application, restructuring the graphical user interface associated with the at least one application, converting text content on the graphical user interface to speech, and presenting a basic version of the graphical user interface associated with the at least one application.

In some embodiments, the system may validate the real-time accessibility data and the real-time usage data based on comparing the real-time accessibility data and the real-time usage data a set of metrics. In some embodiments, the system may analyze the real-time accessibility data and the real-time usage data based on classifying the real-time accessibility data and the real-time usage data into one or more clusters and defining a centroid based on classifying the real-time accessibility data and the real-time usage data into the one or more clusters. In some embodiments, the real-time accessibility score comprises at least one of operating configurations of the user device, status of one or more hardware components of the user device, and internet connectivity. In some embodiments, the real-time usage data comprises activity of the user associated with one or more hardware components of the user device.

In some embodiments, the system may store the accessibility score in a data repository. In some embodiments, the system may identify that the user is accessing at least another application on the user device and render the at least another application based on the accessibility score stored in the data repository.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
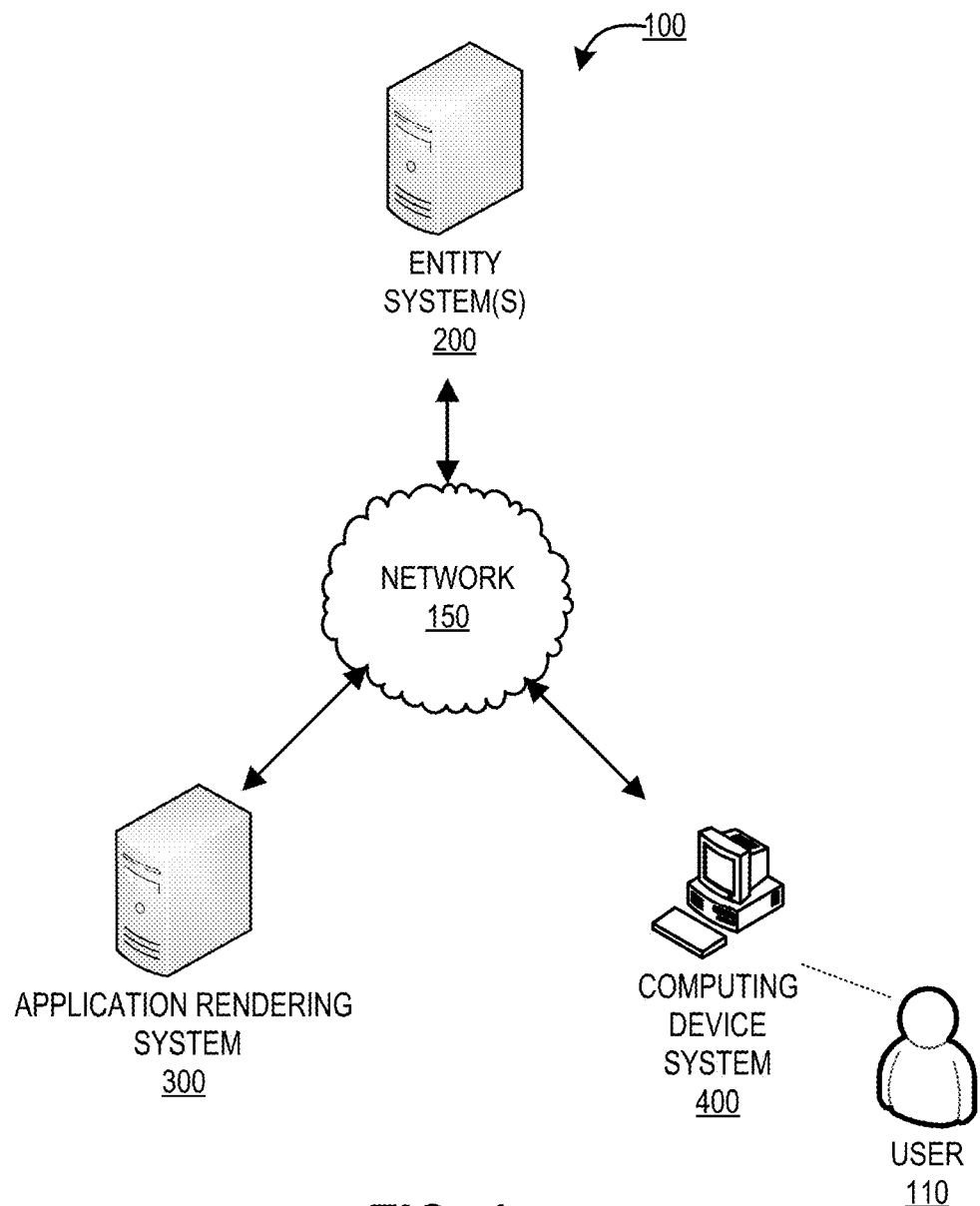
Figure 2:
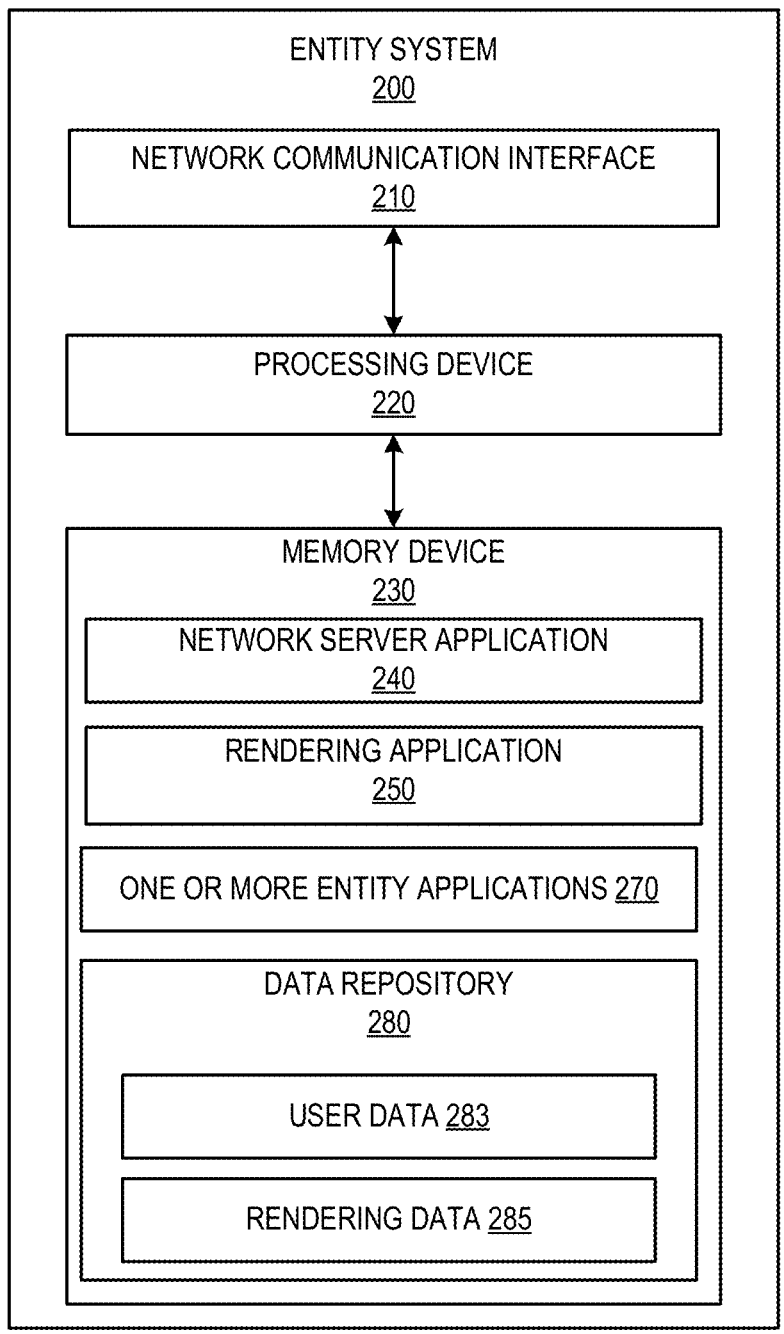
Figure 3:
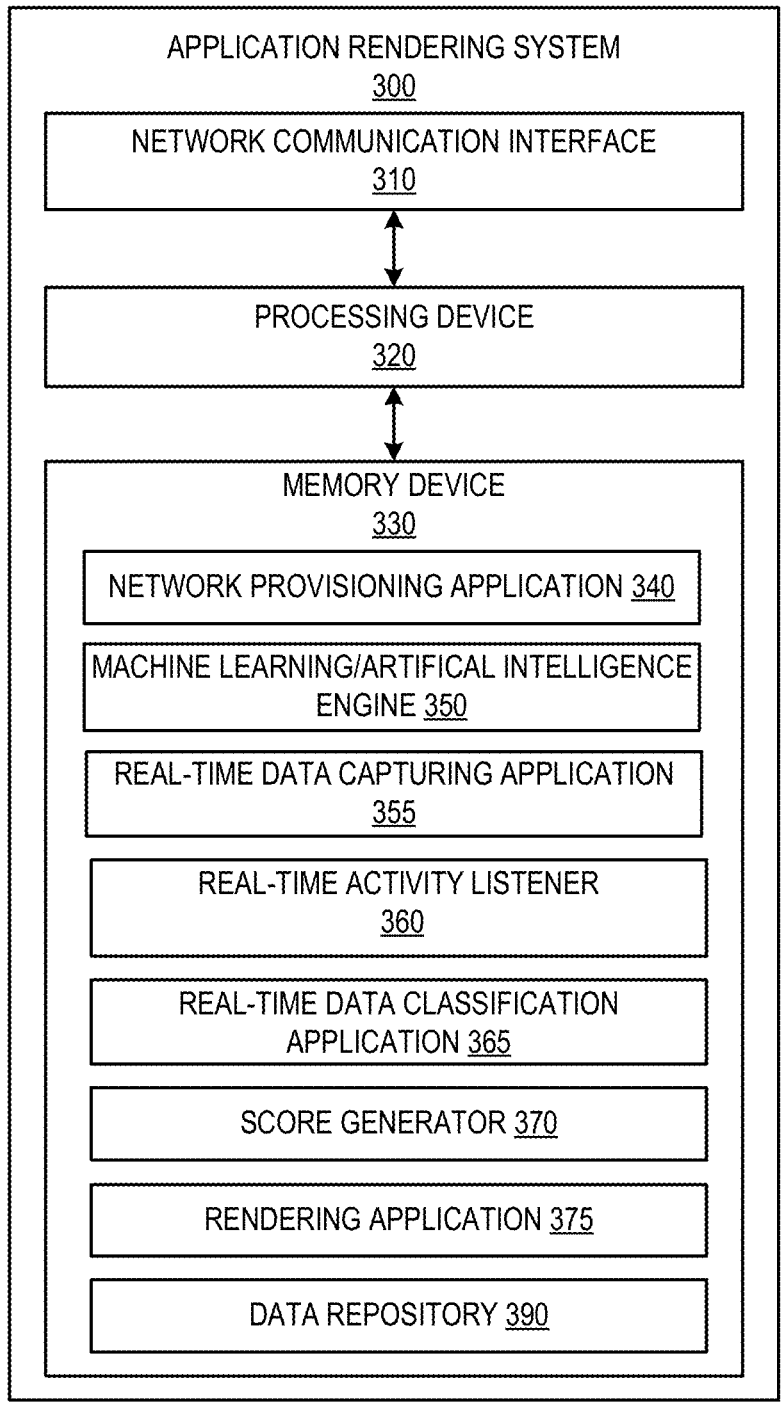
Figure 4:
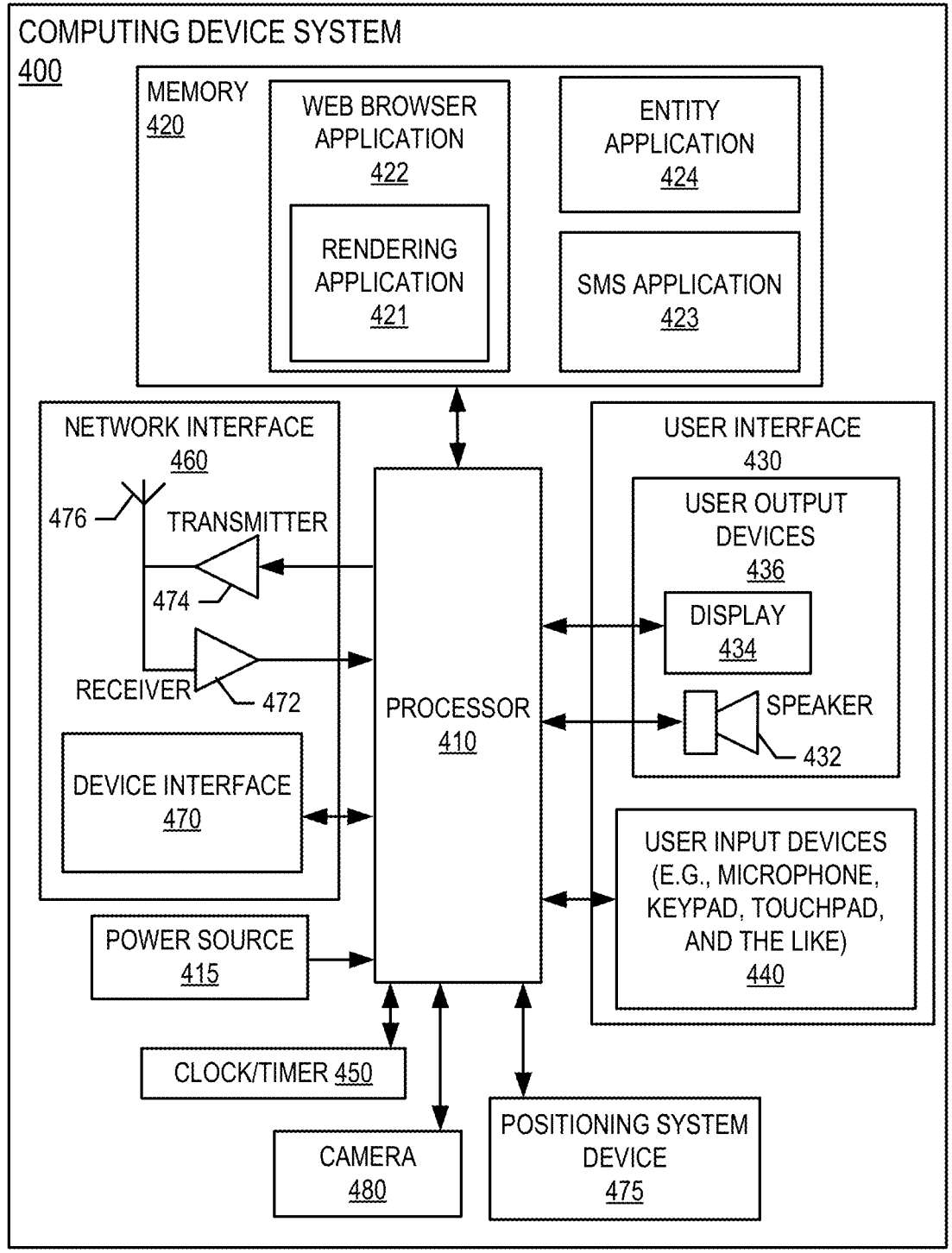
Figure 5:
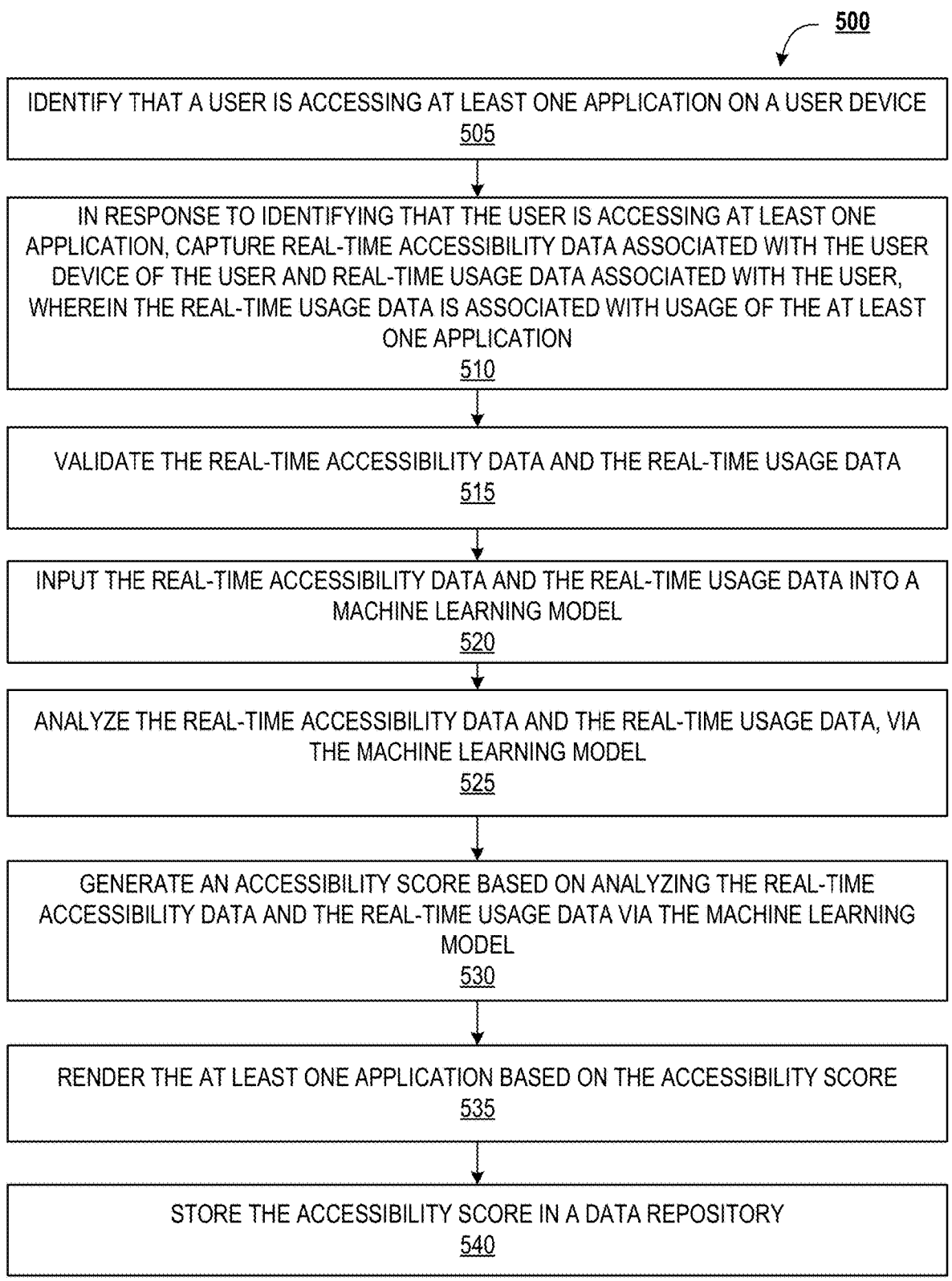

Having thus described embodiments of the invention in general terms, reference will now be made the accompanying drawings, wherein:

FIG. 1 provides a block diagram illustrating a system environment for rendering applications based on real-time accessibility and usability assessment, in accordance with an embodiment of the invention;

FIG. 2 provides a block diagram illustrating the entity system 200 of FIG. 1, in accordance with an embodiment of the invention;

FIG. 3 provides a block diagram illustrating 300 of FIG. 1, in accordance with an embodiment of the invention;

FIG. 4 provides a block diagram illustrating the computing device system 400 of FIG. 1, in accordance with an embodiment of the invention; and FIG. 5 provides a flowchart illustrating a process flow for rendering applications based on real-time accessibility and usability assessment, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a"

and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments of the invention, the terms "entity" may include any organization that processes financial transactions including, but not limited to, banks, credit unions, savings and loan associations, investment companies, stock brokerages, resource management firms, insurance companies and the like. In some embodiments, the "entity" may not be a financial institution. In some other embodiments of the invention, the term "entity" may be any organization that provides any applications to users. Furthermore, embodiments of the present invention use the term "user." It will be appreciated by someone with ordinary skill in the art that the user may be any user of the applications provided by the entity. As used herein, the term application may be any software application. In one embodiment of the invention, the application may be a web application. Although the invention, is explained in terms of web applications, it should be understood that the solution provided by the system of the present invention may be applicable to any software applications.

FIG. 1 provides a block diagram illustrating a system environment 100 for rendering applications based on real-time accessibility assessment, in accordance with an embodiment of the invention. As illustrated in FIG. 1, the environment 100 includes an application rendering system 300, entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be users of applications provided by the entity. The entity system(s) 200 may be any system owned or otherwise controlled by an entity to support or perform one or more process steps described herein.

The application rendering system 300 is a system of the present invention for performing one or more process steps described herein. In some embodiments, the application rendering system 300 may be an independent system. In some embodiments, the application rendering system 300 may be a part of the entity system 200.

The application rendering system 300, the entity system 200, and/or the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the application rendering system 300 is configured to communicate information or instructions with the entity system 200, and/or the computing device system 400 across the network 150.

The computing device system 400 may be a computing device of the user 110. In general, the computing device system 400 communicates with the user 110 via a user interface of the computing device system 400, and in turn is configured to communicate information or instructions with the application rendering system 300, and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a network server application 240, a rendering application 250, one or more entity applications 270, and a data repository 280 comprises user data 283 and rendering data 285. Rendering data may include one or more steps (e.g., rendering applications) to be performed by the system of the present invention 300 based on the accessibility challenges detected by the system. The computer-executable program code of the network server application 240, the rendering application 250, and the one or more entity applications 270 to perform certain logic, data-extraction, and data-storing functions of the entity system 200 described herein, as well as communication functions of the entity system 200. In some embodiments, the rendering application 250 allows the application rendering system 300 to communicate with the entity system 200 to perform one or more steps described herein. The one or more entity applications may be any application provided by the entity system 200 to the user 110.

The network server application 240, the rendering application 250, and the one or more entity applications 270 are configured to store data in the data repository 280 or to use the data stored in the data repository 280 when communicating through the network communication interface 210 with the application rendering system 300, and/or the computing device system 400 to perform one or more process steps described herein. In some embodiments, the entity system 200 may receive instructions from the application rendering system 300 via the rendering application 250 to perform certain operations. The rendering application 250 may be provided by the application rendering system 300. The one or more entity applications 270 may be any of the applications used, created, modified, and/or managed by the entity system 200. In one embodiment, the entity application may be an online banking application provided by the entity system 200.

FIG. 3 provides a block diagram illustrating the application rendering system 300 in greater detail, in accordance with embodiments of the invention. As illustrated in FIG. 3, in one embodiment of the invention, the application rendering system 300 includes one or more processing devices 320 operatively coupled to a network communication interface 310 and a memory device 330. In certain embodiments, the application rendering system 300 is operated by the entity. In some embodiments, the application rendering system 300 is owned or operated by the entity of the entity system 200. In some embodiments, the application rendering system 300 may be an independent system. In alternate embodiments, the application rendering system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the application rendering system 300 described herein. For example, in one embodiment of the application rendering system 300, the memory device 330 includes, but is not limited to, a network provisioning application 340, a machine learning/artificial intelligence engine 350, a real-time data capturing application 355, a real-time data classification application 365, a real-time activity listener 360, a score generator, a rendering application 375, and a data repository 390 comprising data processed or accessed by one or more applications in the memory device 330. The computer-executable program code of the network provisioning application 340, the machine learning/artificial intelligence engine 350, the real-time data capturing application 355, the real-time data classification application 365, the real-time activity listener 360, the score generator, and the rendering application 375, may instruct the processing device 320 to perform certain logic, data-processing, and data-storing functions of the application rendering system 300 described herein, as well as communication functions of the application rendering system 300.

The network provisioning application 340, the machine learning/artificial intelligence engine 350, the real-time data capturing application 355, the real-time data classification application 365, the real-time activity listener 360, the score generator, and the rendering application 375 are configured to invoke or use the data in the data repository 390 when communicating through the network communication interface 310 with the entity system 200, and/or the computing device system 400. In some embodiments, the network provisioning application 340, the machine learning/artificial intelligence engine 350, the real-time data capturing application 355, the real-time data classification application 365, the real-time activity listener 360, the score generator, and the rendering application 375 may store the data extracted or received from the entity system 200, and the computing device system 400 in the data repository 390. In some embodiments, the network provisioning application 340, the machine learning/artificial intelligence engine 350, the real-time data capturing application 355, the real-time data classification application 365, the real-time activity listener 360, the score generator, and the rendering application 375 may be a part of a single application. One or more processes performed by the network provisioning application 340, the machine learning/artificial intelligence engine 350, the real-time data capturing application 355, the real-time data classification application 365, the real-time activity listener 360, the score generator, and the rendering application 375 are described in detail below.

The application rendering system 300 provides an assistive engine that solves the aforementioned technical problems and enhances the user experience while using applications. The network provisioning application 340, the machine learning/artificial intelligence engine 350, the real-time data capturing application 355, the real-time data classification application 365, the real-time activity listener 360, the score generator, and the rendering application 375, or any other applications that perform one or more steps described in the process flow 500 are part of the assistive engine. The assistive engine may be embedded in any applications (e.g., web application).

The network provisioning application 340 allows the application rendering system 300 to communicate with the computing device system 400. The artificial intelligence or the machine learning model 350 performs analysis of the data inputted by the system 300 to generate an accessibility score. The real-time data capturing application 355 captures data associated with the computing device system 400 and one or more components of the computing device system 400 of the user. The real-time activity listener 360 captures user activity of the user on the computing device system 400, where the user activity may be specific to an application that the user is accessing. The score generator may be a part of the artificial intelligence/machine learning model 350. The rendering application 375 may render an application that the user is accessing based on the accessibility score generated by the artificial intelligence/machine learning model 350.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, gaming devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110 may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422 comprising a rendering application, an entity application 424, or the like. These applications also typically instructions to a graphical user interface (GUI) on the display 430 that allows the user 110 to interact with the entity system 200, the application rendering system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the rendering application 421 is provided by the application rendering system 300 and is embedded within one or more applications such as the web browser application 422, entity application 424, or the like. The rendering application 421 allows the application rendering system 300 to render the graphical user interface of the one or more applications on the computing device system 400. In some embodiments, the entity application 424 may be an online banking application provided by the entity system 200. In some embodiments, the entity application 424 may be any web application provided by the entity system 200. In some embodiments, the application rendering system 300 allows the application rendering system to capture user activity of the user 110 and also to render the one or more applications.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 illustrates a process flow 500 for rendering applications based on real-time accessibility assessment, in accordance with an embodiment of the present invention. As shown in block 505, the system identifies that a user is accessing at least one application on a user device. In some embodiments, the at least one application may be a web application. In such embodiments, the user may access the web application via a web browser, where one or more features of the web application are displayed to the user via a graphical user interface of the web browser.

As shown in block 510, the system in response to identifying that the user is accessing at least one application, captures real-time accessibility data associated with the user device of the user and real-time usage data associated with the user, wherein the real-time usage data is associated with usage of the at least one application. The real-time accessibility data may include, but is not limited to, operating or system configurations of the user device (e.g., operating system, operating system settings, or the like), status (e.g., ON, OFF, enabled, disabled, or the like) of one or more hardware components of the user device (e.g., microphone, camera, mouse, keyboard, or the like), internet connectivity (e.g., upload speed, download speed, or the like), software configurations (e.g., web browser settings such as zoom level, font size, etc.), or the like. The real-time usage data may include, but is not limited to, mouse activity, keyboard activity, scroll activity, screen readers activity, web browser tab switching activity, web browser tab closing activity, typing activity, mouse movement delay, web page refresh activity, touch screen activity, microphone activity, audio activities, or the like. In some embodiments, the system may capture the real-time usage activity after a defined time period. For example, the system may capture the real-time usage activity for every 5 seconds.

In some embodiments, the system may capture data associated with the one or more hardware components only after detecting the presence of the one or more hardware components. For example, the system may identify that a mouse is not present on the user device and may not capture the status of the mouse or the user activity associated with the mouse (e.g., scroll speed, mouse movement, or the like).

As shown in block 515, the system validates the real-time accessibility data and the real-time usage data. The system may validate the real-time accessibility data and the real-time usage data based on comparing the real-time accessibility data and the real-time usage data with a set of metrics. In some embodiments, the system may assign a value based on comparing the real-time accessibility data and the real-time usage data with the set of metrics. For example, the system may identify that a font size of the web browser and may compare the font size with the set of metrics to identify that the font size is unusually large and may assign a value of 10, where the value '10' being highest, '5' being moderate, and '0' being lowest. In another example, the system may identify the internet connectivity of the user device and may compare the internet connectivity with the set of metrics to identify that the internet connectivity is poor and may assign a value of '1'. In some embodiments, the set of metrics may be provided by the entity.

As shown in block 520, the system inputs the real-time accessibility data and the real-time usage data into a machine learning model. In some embodiments, the machine learning model comprises k-means clustering algorithm. In some embodiments, the system may convert the real-time accessibility data and the real-time usage data into Boolean numbers before inputting the real-time accessibility data and the real-time usage data into the machine learning model.

As shown in block 525, the system analyzes the real-time accessibility data and the real-time usage data, via the machine learning model. The system analyzes the data based on classifying the real-time accessibility data and the real-time usage data into one or more clusters and defining a centroid associated with the real-time accessibility data and the real-time usage data. The machine learning model may map the inputted data before classifying the real-time accessibility data and the real-time usage data into one or more clusters and defining a centroid. In some embodiments, the system may use historical data and training data that is used to train the machine learning model to perform the analysis. As shown in block 530, the system generates an accessibility score based on analyzing the real-time accessibility data and the real-time usage data via the machine learning model. In some embodiments, the accessibility score may be high, intermediate, or low. For example, the system may identify that the internet connectivity is poor and may generate a low accessibility score.

As shown in block 535, the system renders the at least one application based on the accessibility score. Rendering the at least one application may include, but is not limited to, prioritizing content on a graphical user interface associated with the at least one application, restructuring the graphical user interface associated with the at least one application, converting text content on the graphical user interface to speech, and presenting a basic version of the graphical user interface associated with the at least one application. Rendering the at least one application based on the accessibility score enhances the user experience while using the web application.

In an exemplary embodiment, the system may generate a low accessibility score based on identifying that the speaker volume is high, font size is high, or the like. In such an embodiment, the system may identify that the user may have accessibility challenge (e.g., visual impairment) and may automatically convert the text content associated with the web application into speech using Natural Language Processing (NLP) engine. In another exemplary embodiment where the generated accessibility score is low based on identifying that the internet connectivity is low, the system may restructure the web application and/or prioritizes the web application to display only the content that is most accessed by the user.

In an exemplary embodiment, the system may generate an intermediate accessibility score based on identifying that the internet connectivity is neither high nor low. In such an embodiment, the system may modify the graphical user interface associated with the web page of the web application to present a basic version (e.g., html version) of the web page.

In another exemplary embodiment, the system may generate a high score based on identifying that the speaker volume is normal, scroll activity is normal, font size is normal, internet connectivity is high, or the like. In such an embodiment, the system does not perform any actions and continues to monitor the user activity.

As shown in block 540, the system stores the accessibility score in a data repository. In some embodiments, the system may use the stored accessibility scores to further train the machine learning model. In some embodiments, as the data stored in the data repository increases over a period of time, the system of the present invention utilizes the stored data that associated with one or more users to generate the accessibility scores faster, thereby improving the efficiency of the process.

In some embodiments, the system may also utilize the accessibility score stored in the data repository for rendering other applications that are accessed on the same user device of the user. The system may identify that the user is accessing at least another application on the same user device and may utilize the accessibility score stored in the data repository to render the at least another application, thereby improving efficiency of the process. The system may continue to monitor the user activity and may further render the at least another application based on the real-time user activity. In some embodiments, the system may allow the user to toggle ON/OFF the feature of rendering applications provided by the system of the present invention.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for rendering applications based on real-time accessibility assessment, comprising:
    one or more computer processors;
    a memory; and
    a processing module stored in the memory, executable by the one or more computer processors and configured to:

identify that a user is accessing at least one application on a user device;

in response to identifying that the user is accessing at least one application, capture real-time accessibility data associated with the user device of the user and real-time usage data associated with the user, wherein the real-time usage data is associated with usage of the at least one application, wherein the real-time accessibility data associated with the user device comprises at least operating system configurations, status of one or more hardware components, internet connectivity, and software configurations;

validate the real-time accessibility data and the real-time usage data;

input the real-time accessibility data and the real-time usage data into a machine learning model;

analyze the real-time accessibility data and the real-time usage data, via the machine learning model; and generate an accessibility score based on analyzing the real-time accessibility data and the real-time usage data via the machine learning model.

2. The system according to claim 1, wherein the processing module is further configured to render the at least one application based on the accessibility score.

3. The system according to claim 2, wherein the processing module is configured to render the at least one application by performing at least one of:
prioritizing content on a graphical user interface associated with the at least one application;
restructuring the graphical user interface associated with the at least one application;
converting text content on the graphical user interface to speech; and
presenting a basic version of the graphical user interface associated with the at least one application.

4. The system according to claim 1, wherein the processing module is configured to validate the real-time accessibility data and the real-time usage data based on comparing the real-time accessibility data and the real-time usage data a set of metrics.

5. The system according to claim 1, wherein the processing module is further configured to analyze the real-time accessibility data and the real-time usage data based on:
classifying the real-time accessibility data and the real-time usage data into one or more clusters; and
defining a centroid based on classifying the real-time accessibility data and the real-time usage data into the one or more clusters.

6. The system according to claim 1, wherein the real-time usage data comprises activity of the user associated with the one or more hardware components of the user device.

7. The system according to claim 1, wherein the processing module is further configured to store the accessibility score in a data repository.

8. The system according to claim 2, wherein the processing module is further configured to:
identify that the user is accessing at least another application on the user device; and
render the at least another application based on the accessibility score stored in the data repository.

9. A computer program product for rendering applications based on real-time accessibility assessment, comprising a non-transitory computer-readable storage medium having computer-executable instructions for:
identifying that a user is accessing at least one application on a user device;

in response to identifying that the user is accessing at least one application, capturing real-time accessibility data associated with the user device of the user and real-time usage data associated with the user, wherein the real-time usage data is associated with usage of the at least one application, wherein the real-time accessibility data associated with the user device comprises at least operating system configurations, status of one or more hardware components, internet connectivity, and software configurations;

validating the real-time accessibility data and the real-time usage data;

inputting the real-time accessibility data and the real-time usage data into a machine learning model;

analyzing the real-time accessibility data and the real-time usage data, via the machine learning model; and generating an accessibility score based on analyzing the real-time accessibility data and the real-time usage data via the machine learning model.

10. The computer program product according to claim 9, wherein the non-transitory computer-readable storage medium comprises computer-executable instructions for rendering the at least one application based on the accessibility score.

11. The computer program product according to claim 10, wherein the non-transitory computer-readable storage medium comprises computer-executable instructions for rendering the at least one application based on performing at least one of:
prioritizing content on a graphical user interface associated with the at least one application;
restructuring the graphical user interface associated with the at least one application;
converting text content on the graphical user interface to speech; and
presenting a basic version of the graphical user interface associated with the at least one application.

12. The computer program product according to claim 9, wherein the non-transitory computer-readable storage medium comprises computer-executable instructions for validating the real-time accessibility data and the real-time usage data based on comparing the real-time accessibility data and the real-time usage data a set of metrics.

13. The computer program product according to claim 9, wherein the non-transitory computer-readable storage medium comprises computer-executable instructions for analyzing the real-time accessibility data and the real-time usage data based on:
classifying the real-time accessibility data and the real-time usage data into one or more clusters; and
defining a centroid based on classifying the real-time accessibility data and the real-time usage data into the one or more clusters.

14. The computer program product according to claim 9, wherein the non-transitory computer-readable storage medium comprises computer-executable instructions for:
storing the accessibility score in a data repository;
identifying that the user is accessing at least another application on the user device; and
rendering the at least another application based on the accessibility score stored in the data repository.

15. A computerized method for rendering applications based on real-time accessibility assessment, comprising:
identifying that a user is accessing at least one application on a user device;
in response to identifying that the user is accessing at least one application, capturing real-time accessibility data associated with the user device of the user and real-time usage data associated with the user, wherein the real-time usage data is associated with usage of the at least one application, wherein the real-time accessibility data associated with the user device comprises at least operating system configurations, status of one or more hardware components, internet connectivity, and software configurations;

validating the real-time accessibility data and the real-time usage data;

inputting the real-time accessibility data and the real-time usage data into a machine learning model;

analyzing the real-time accessibility data and the real-time usage data, via the machine learning model; and generating an accessibility score based on analyzing the real-time accessibility data and the real-time usage data via the machine learning model.

16. The computerized method according to claim 15, wherein the method further comprises rendering the at least one application based on the accessibility score.

17. The computerized method according to claim 16, wherein the method for rendering the at least one application comprises:

prioritizing content on a graphical user interface associated with the at least one application;

restructuring the graphical user interface associated with the at least one application;

converting text content on the graphical user interface to speech; and presenting a basic version of the graphical user interface associated with the at least one application.

18. The computerized method according to claim 15, wherein the method for validating the real-time accessibility data and the real-time usage data comprises comparing the real-time accessibility data and the real-time usage data a set of metrics.

19. The computerized method according to claim 15, wherein the method for analyzing the real-time accessibility data and the real-time usage data comprises:

classifying the real-time accessibility data and the real-time usage data into one or more clusters; and defining a centroid based on classifying the real-time accessibility data and the real-time usage data into the one or more clusters.

* * * * *